(12) United States Patent
Chang

(10) Patent No.: US 10,883,073 B2
(45) Date of Patent: Jan. 5, 2021

(54) LIQUOR QUALITY OPTIMIZATION DEVICE

(71) Applicant: Yuan-Hao Chang, Taipei (TW)

(72) Inventor: Yuan-Hao Chang, Taipei (TW)

( * ) Notice: Subject to any disclaimer, the term of this patent is extended or adjusted under 35 U.S.C. 154(b) by 230 days.

(21) Appl. No.: 16/130,420

(22) Filed: Sep. 13, 2018

(65) Prior Publication Data
US 2020/0087602 A1 Mar. 19, 2020

(51) Int. Cl.
| | | |
|---|---|---|
| *B67D 3/00* | (2006.01) | |
| *C12H 1/12* | (2006.01) | |
| *B01F 3/04* | (2006.01) | |
| *B01D 29/54* | (2006.01) | |
| *B01D 61/14* | (2006.01) | |

(52) U.S. Cl.
CPC ............... *C12H 1/12* (2013.01); *B01D 29/54* (2013.01); *B01F 3/04099* (2013.01); *B01F 3/04787* (2013.01); *B67D 3/00* (2013.01); *B01D 61/142* (2013.01); *B01D 61/147* (2013.01); *B01F 2003/04865* (2013.01)

(58) Field of Classification Search
CPC .... B01F 3/04; B01F 3/04099; B01F 3/04787; B01D 2003/04865; B67D 3/00; C12H 1/12

USPC ............................ 99/323.1; 261/76, DIG. 75
See application file for complete search history.

(56) References Cited

U.S. PATENT DOCUMENTS

| | | | | |
|---|---|---|---|---|
| 8,205,541 B2 * | 6/2012 | Barberio | ............... | B01F 3/0446 222/566 |
| 8,251,352 B2 * | 8/2012 | Chiorazzi | ............. | B01F 3/0446 222/190 |

\* cited by examiner

*Primary Examiner* — Robert A Hopkins
(74) *Attorney, Agent, or Firm* — Muncy, Geissler, Olds & Lowe, P.C.

(57) ABSTRACT

A liquor quality optimization device includes a main body defining a receiving chamber having an inlet portion and an outlet portion; an adaptor head coupled to the inlet portion of the main body for attachment to a liquor container, having a fluid passage in communication with the receiving chamber of the main body and an air passage in communication between the fluid passage and an exterior of the adaptor head; and a liquor molecular refinement structure disposed within the receiving chamber in the main body, having properties to cut and refine macromolecules in liquor into small molecules, thereby accelerating conversion of ingredients in the liquor which affects the taste, and decanting new brewed liquor as aged liquor in taste in addition to filtering sediments in liquor to enhance the taste of liquor.

12 Claims, 13 Drawing Sheets

LIQUOR QUALITY OPTIMIZATION DEVICE

BACKGROUND OF THE INVENTION

1. Field of the Invention

The present invention relates generally to a liquor quality optimization device, and more particularly to a liquor quality optimization device which is capable of cutting and refining macromolecules in liquor into small molecules.

2. The Prior Arts

Liquor is a long-established beverage that is fermented by plants. The conventional liquors include champagne, red wine, beer, whiskey, sorghum and so on. Different kinds of liquors have different tastes depending on the ingredients they contain.

For example, the red wine has high tannin content and tannin is a phenolic substance, after reacting with the protein in saliva, the tannins will immediately feel the astringent taste of tannins, which is the main reason, why red wine tastes sour and astringent. Tannins are particularly important for increasing the complexity and ageing potential of red wine. New brewed red wines brewed from grape varieties such as Cabernet Sauvignon, Nebbiolo and Tempranillo usually contain extremely high levels of tannins, which are astringent and are usually suitable for a long period of aging time to become drinkable. However, whether it is a new brewed red wine or an aged red wine, the red wine is characterized by a high content of tannins. Therefore, in order to reduce the acidity and astringency of red wine, it is necessary to allow the red wine to fully contact the air after opening the bottle. As the contact area and time of red wine and oxygen increases, oxidation is accelerated, thereby making the taste of red wine softer and smoother and the aroma richer and achieving the decanting effect.

As another example, the whisky or sorghum liquor just newly brewed, the content of acetaldehyde is high, resulting in an unpleasant pungent sensation and at the same time suppressing the user's perception of other aroma. Aged whisky or sorghum liquor is converted to acetaldehyde (through oxidation/esterification/condensation) by storing it in a well-ventilated container in a suitable environment, dissipating other reactions to make the liquor more "not spicy". Therefore, aged whisky or sorghum liquor is not very spicy and suit user's taste.

It takes time for new brewed liquors to become aged liquors, this is the reason why the so-called liquors are getting more and more fragrant, the price of aged liquor increases year by year with its long-term, is very expensive. Only those who really love liquor tasting will buy it. A majority of people think that buying liquor at a high price is a burden for them.

In addition, precipitation in aged red wine is a normal phenomenon and a symbol of aged red wine. This precipitate is generally granular or rust-like. This is the result of the combination of tannins and pigments during the aging process of red wine. In addition, tartaric acid in red wine also produces crystals at low temperatures.

SUMMARY OF THE INVENTION

A primary objective of the present invention is to provide a liquor quality optimization device that can cut and refine macromolecules in liquor into small molecules and that accelerates the ingredients in the liquor which affects the taste (for example, tannin in red wine or acetaldehyde in whiskey and sorghum). The rate of conversion (through oxidation/esterification/condensation in tannin or acetaldehyde) can reduce the content of ingredients in the liquor that affect the taste, enhance the liquor's taste and mouth feel so that the mouth feel of the liquor becomes much softer and smoother and makes the new brewed liquor more enjoyable to drink. The mouth feel is as sweet as the aged liquor, reducing the average person's burden of purchasing expensive aged liquor.

Another objective of the present invention is to provide a liquor quality optimization device, which can increase the contact area and time of the components of the liquor with oxygen and accelerates oxidation in the process of cutting and refining macromolecules in liquor into small molecules, thereby making the taste of the liquor softer and smoother, the aroma richer and achieving the effect of liquor decanting.

A further objective of the present invention is to provide a liquor quality optimization device that can filter sediment in liquor and improves the taste of liquor.

Yet another objective of the present invention is to provide a liquor quality optimization device so that allows the space inside the liquor container and the outside through the air passage remains open. Without the obstruction of the air, the flow of the liquor through the liquor quality optimization device of the present invention can be maintained at the maximum in unit time, greatly improves the liquor molecular refinement structure for effectively cutting and refining the macromolecules in the liquor into small molecules. Increase the flow rate of the liquor can effectively shorten the time for the liquor to pass through the liquor quality optimization device.

For achieving the foregoing objectives, the present invention provides a liquor quality optimization device, includes: a main body, an adaptor head and a liquor molecular refinement structure.

The main body defines a receiving chamber, has an inlet portion and an outlet portion.

The adaptor head is coupled to the inlet portion of the main body for attachment to a liquor container, has an axially extending fluid passage in communication with the receiving chamber of the main body and an air passage in communication between the fluid passage and an exterior of the adaptor head.

The liquor molecular refinement structure is disposed within the receiving chamber in the main body, has properties to cut and refine macromolecules in liquor into small molecules.

Preferably, the adaptor head has an annular flange, an inlet coupler portion disposed on a top side of the annular flange and installed detachably on the inlet portion of the main body and a container coupler portion disposed on a bottom side of the annular flange and capable of inserting into the liquor container, wherein, the annular flange has an outer diameter greater than outer diameters of the inlet coupler portion and the container coupler portion such that upon insertion the container coupler portion into the liquor container results in abutment of the liquor container against the bottom side of the annular flange, the fluid passage extends through the inlet coupler portion, the annular flange and the container coupler portion and penetrates through an end portion of the inlet coupler portion and an end portion of the container coupler portion while the air passage extends through inner and outer side walls of the inlet coupler portion, wherein, the liquor molecular refinement structure further includes a block disposed on the top side of the annular flange and abutted to a bottom side of the inlet portion of the main body such that the block has a thickness greater than or equal to a distance between a bottom side of an opening of the air passage and the top side of the annular flange.

Preferably, the opening of the air passage is located adjacent to the top side of the annular flange. The adaptor head further includes an air passage position indicator formed on an outer wall surface of the annular flange corresponding with the opening of the air passage.

Preferably, the top side of the annular flange is formed with a channel extending radially and inwardly from the outer wall surface thereof toward and communicated with the opening of the air passage.

Preferably, the adaptor head has an annular flange, an inlet coupler portion disposed on a top side of the annular flange and detachably installed in the inlet portion of the main body and a container coupler portion disposed on a bottom side of the annular flange and capable of inserting into the liquor container, wherein, the annular flange has an outer diameter greater than outer diameters of the inlet coupler portion and the container coupler portion such that upon insertion the container coupler portion into the liquor container results in abutment of the liquor container against the bottom side of the annular flange, the fluid passage extends through the inlet coupler portion, the annular flange and the container coupler portion and penetrates through an end portion of the inlet coupler portion and an end portion of the container coupler portion while the air passage extends through inner and outer side walls of the inlet coupler portion, wherein, the liquor molecular refinement structure further includes a block disposed on a bottom side of the inlet portion of the main body and abutted to the top side of the annular flange such that the block has a thickness greater than or equal to a distance between a bottom side of an opening of the air passage and the top side of the annular flange.

Preferably, the opening of the air passage is located adjacent to the top side of the annular flange. The adaptor head further includes an air passage position indicator formed on an outer wall surface of the annular flange corresponding with the opening of the air passage.

Preferably, the top side of the annular flange is formed with a channel extending radially and inwardly from the outer wall surface thereof toward and communicated with the opening of the air passage.

In one embodiment, the liquor quality optimization device of the present invention further includes a liquor pouring head coupled to the outlet portion of the main body and has a liquor discharge outlet in communication with the receiving chamber of the main body.

Preferably, the outlet portion extends upwardly from a top end of the main body. The liquor pouring head further includes an outlet coupler portion for detachably coupling the outlet portion of the main body and a liquor guide section extending axially from the outlet coupler portion and formed with a liquor discharge mouth inclined with respect to an axis of the liquor guide section such that the liquor discharge outlet extends and is in communication with the liquor guide section and the outlet coupler portion.

In one embodiment of the present invention, the liquor pouring head is integrally formed with the outlet portion of the main body, and is formed with a liquor discharge mouth inclined with respect to an axis of the liquor pouring head.

Preferably, the liquor molecular refinement structure further includes a filtering block, which is disposed within the receiving chamber of the main body to divide the receiving chamber of said main body into a first chamber adjacent to the inlet portion of the main body and a second chamber adjacent to the outlet portion of the main body and which defines a plurality of parallel gaps, a plurality of first filtering particles disposed in the first chamber and a plurality of second filtering particles disposed in the second chamber, wherein, the liquor quality optimization device further includes two partition nets disposed within the main body in such a manner to respectively cover the inlet and outlet portions of the main body. The partition nets have a plurality of net openings with diameters smaller than diameters of the first and second filtering particles.

According to an embodiment of the present invention, the liquor container includes a chest defining a receiving chamber, a liquor trough disposed on a top side of the chest, an upper guide tube connected with the liquor trough and extending interior of the receiving chamber in the chest, a liquor receiving trough disposed within the receiving chamber in the chest, a lower guide tube connected with the liquor receiving trough and the adaptor heads of two of liquor quality optimization devices connected respectively to the upper and lower guide tubes such that the outlet portion of the main body of one of liquor quality optimization devices connected with the upper guide tube is spaced apart and located above the liquor receiving trough.

According to an embodiment of the present invention, the main body has a head body portion, a tail body portion and a bent body portion between the head body portion and the tail body portion such that the main body has a bent configuration, wherein the inlet portion of the main body is formed at the head body portion while the outlet portion of the main body is formed at the tail body portion. The liquor molecular refinement structure further includes a first filtering block, which is disposed within the head body portion and which defines a plurality of parallel gaps, a second filtering block, which is disposed within the tail body portion and which defines a plurality of parallel gaps, the first and second filtering blocks dividing the main body into a first chamber in the head body portion adjacent to the inlet portion of the main body, a second chamber in the bent body portion and a third chamber in the tail body portion adjacent to the outlet portion of the main body, wherein a plurality of first filtering particles are disposed in said first chamber and a plurality of second filtering particles are disposed in said second chamber and a plurality of third filtering particles are disposed in said third chamber, wherein, the liquor quality optimization device further includes two partition nets disposed within the main body in such a manner to respectively cover the inlet and outlet portions of the main body. The partition nets have a plurality of net openings with diameters smaller than diameters of the first and third filtering particles.

The advantages provided by the liquor quality optimization device of the present invention are as follows: the macromolecules in liquor are cut and refined into small molecules and results in accelerating the ingredients in the liquor which affects the taste (for example, tannin in red wine or acetaldehyde in whiskey and sorghum). The rate of conversion (through oxidation/esterification/condensation in tannin or acetaldehyde) can reduce the content of ingredients in the liquor that affect the taste, enhance the liquor's taste and mouth feel, and the mouth feel of the liquor becomes much softer and smoother and makes the new brewed liquor comfortable to drink. The mouth feel is as sweet as the aged liquor, which in turn, reduces an average person's burden of purchasing expensive aged liquor.

During the conversion of the macromolecules in liquor into small molecules, the contact area and time of liquor and oxygen increases, oxidation is accelerated, thereby causing the taste of liquor softer and smoother and the aroma richer, thereby achieving the decanting effect.

In addition, the liquor quality optimization device of the present invention can filter sediments in liquor to enhance the taste of liquor.

In addition, the liquor quality optimization device of the present invention allows the space inside the liquor container and the outside through the air passage remains open. Without the obstruction of the air, the flow of the liquor through the liquor quality optimization device of the present invention can be maintained at the maximum in unit time, greatly improves the liquor molecular refinement structure for effectively cutting and refining the macromolecules in the liquor into small molecules. Increase the flow rate of the liquor can effectively shorten the time for the liquor to pass through the liquor quality optimization device.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
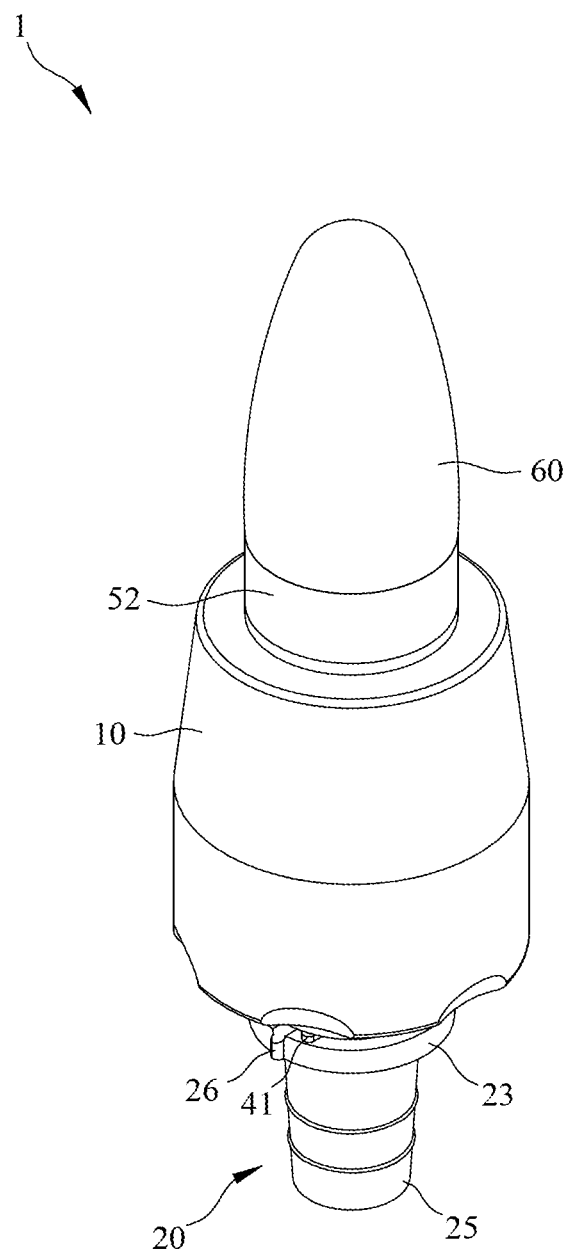
FIG. 1 is a perspective view of a liquor quality optimization device according to a first embodiment of the present invention.
Figure 2:
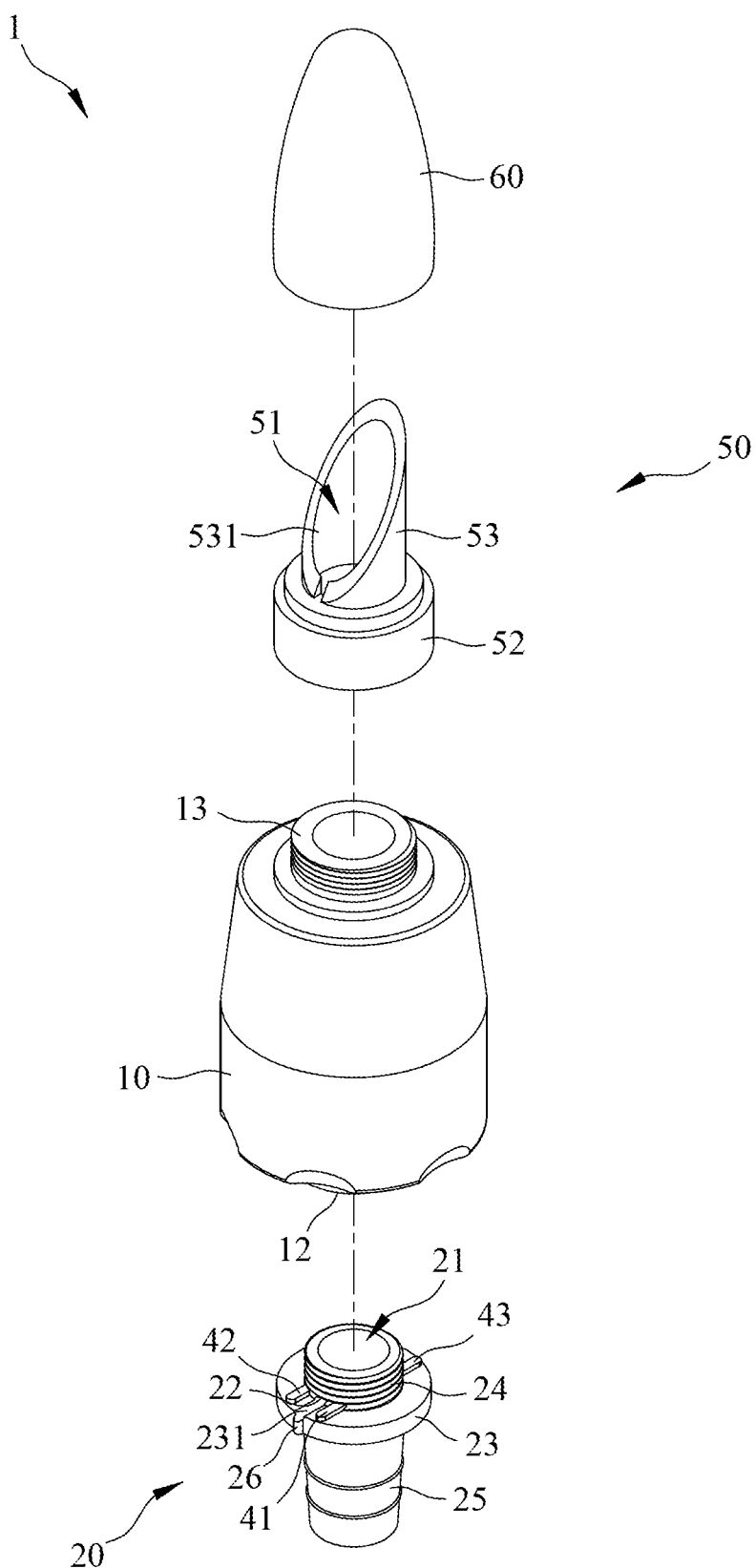
FIG. 2 is a perspective and exploded view of the liquor quality optimization device according to the first embodiment of the present invention.
Figure 3:
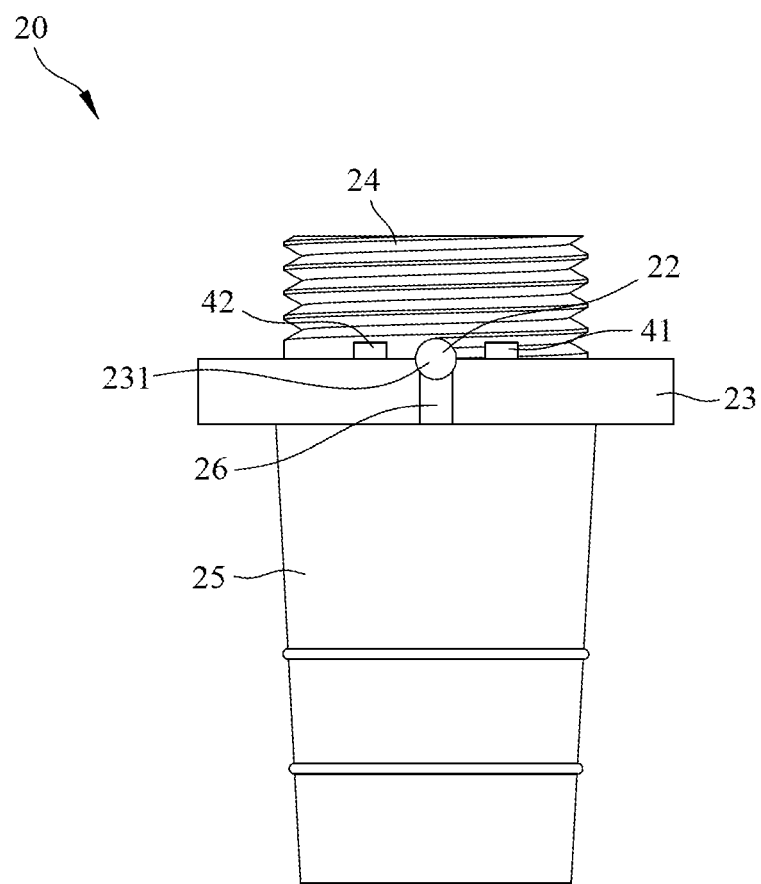
FIG. 3 is a front view of an adaptor head employed in the liquor quality optimization device according to the first embodiment of the present invention.
Figure 4:
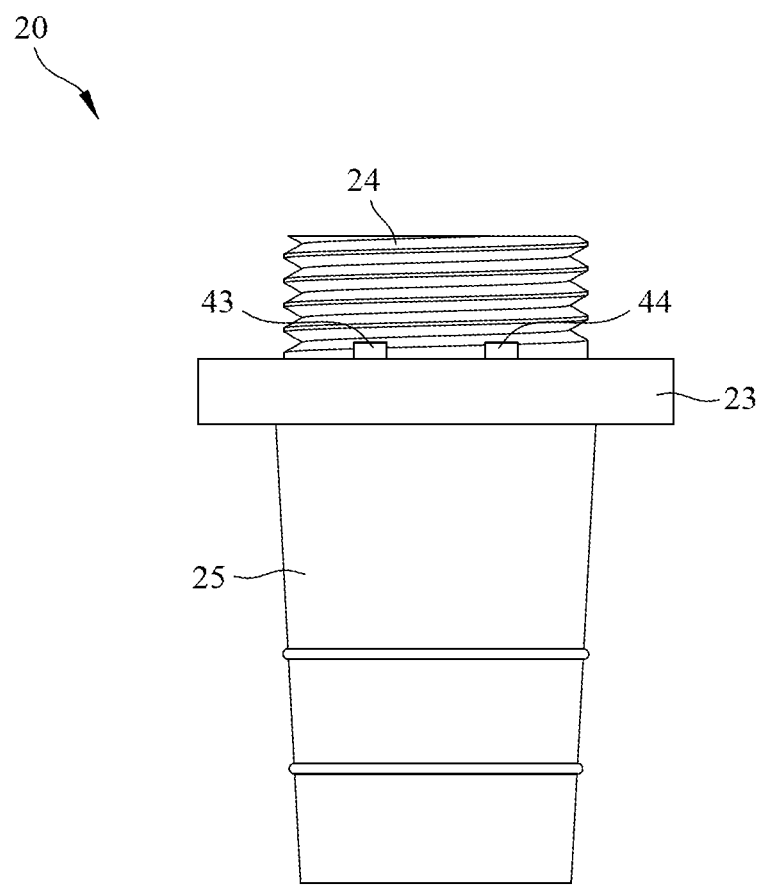
FIG. 4 is a rear view of the adaptor head employed in the liquor quality optimization device according to the first embodiment of the present invention.
Figure 5:
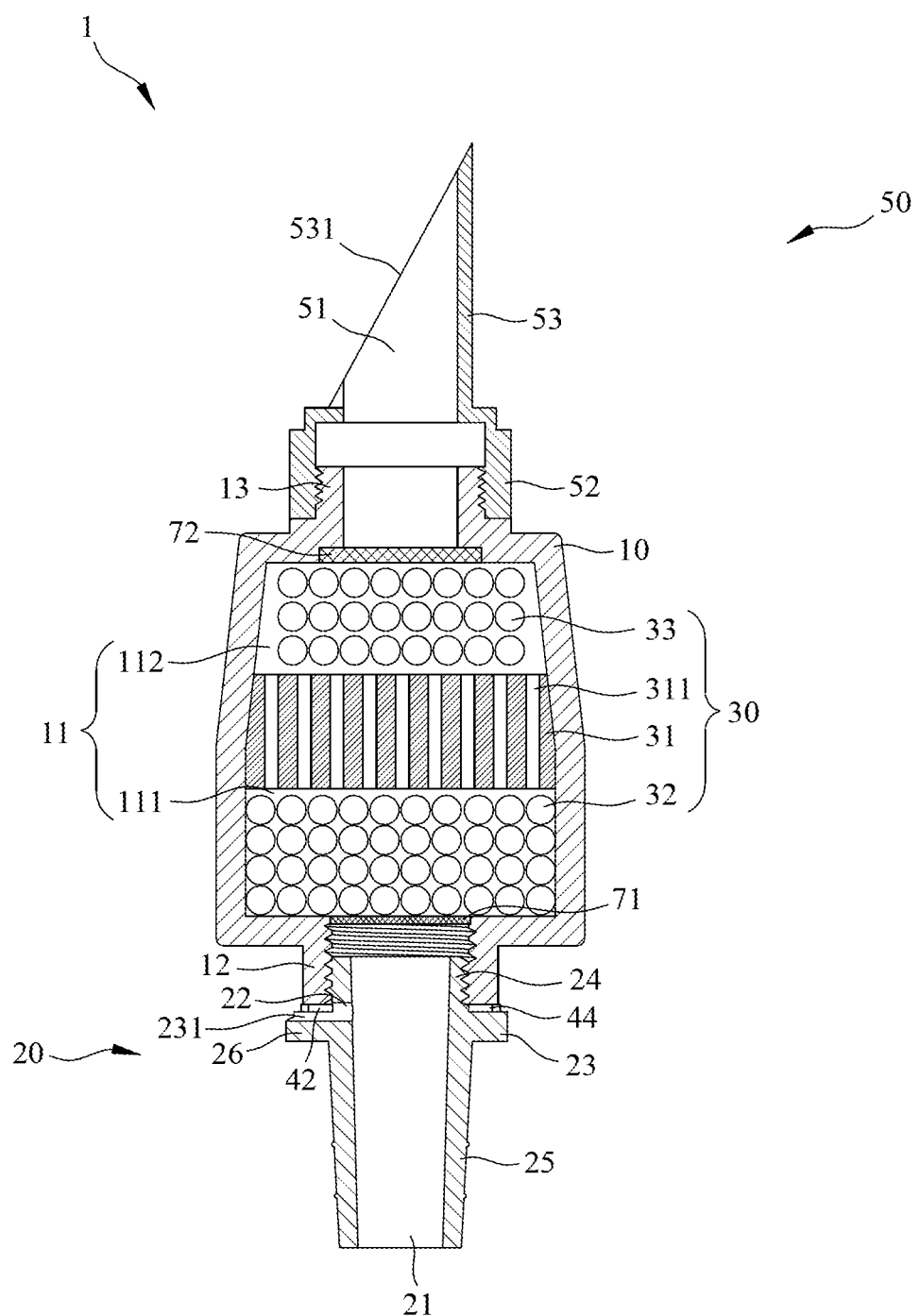
FIG. 5 is a cross-sectional view of the liquor quality optimization device according to the first embodiment of the present invention.
Figure 6:
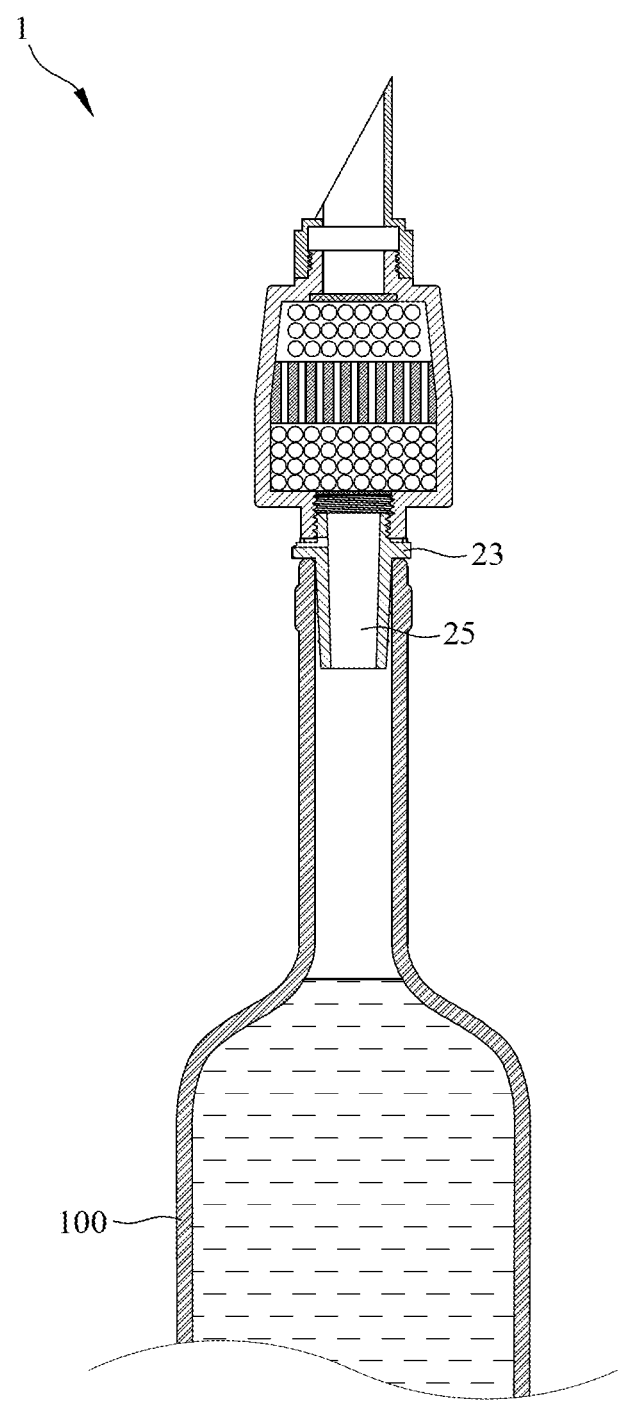
FIG. 6 illustrates how the adaptor head in the liquor quality optimization device according to the first embodiment of the present invention connects with a liquor container.

Referring to FIGS. 1 to 6, wherein, FIG. 1 is a perspective view of a liquor quality optimization device according to a first embodiment of the present invention; FIG. 2 is a perspective and exploded view of the liquor quality optimization device according to the first embodiment of the present invention; FIG. 3 is a front view of an adaptor head employed in the liquor quality optimization device according to the first embodiment of the present invention; FIG. 4 is a rear view of the adaptor head employed in the liquor quality optimization device according to the first embodiment of the present invention; FIG. 5 is a cross-sectional view of the liquor quality optimization device according to the first embodiment of the present invention; and FIG. 6 illustrates how the adaptor head in the liquor quality optimization device according to the first embodiment of the present invention is connected to a liquor container. As shown in FIGS. 1 to 6, a liquor quality optimization device 1 of the present invention includes: a main body 10, an adaptor head 20 and a liquor molecular refinement structure 30. The main body 10 defines a receiving chamber 11 and has an inlet portion 12 and an outlet portion 13 opposite to the inlet portion 12. The adaptor head 20 is coupled to the inlet portion 12 of the main body 10 for attachment to a liquor container 100, has an axially extending fluid passage 21 in communication with the receiving chamber 11 of the main body 10 and an air passage 22 in communication between the fluid passage 21 and an exterior of the adaptor head 20. The liquor molecular refinement structure 30 is disposed within the receiving chamber 11 in the main body 10, has properties to cut and refine macromolecules in liquor into small molecules.

Figure 7:
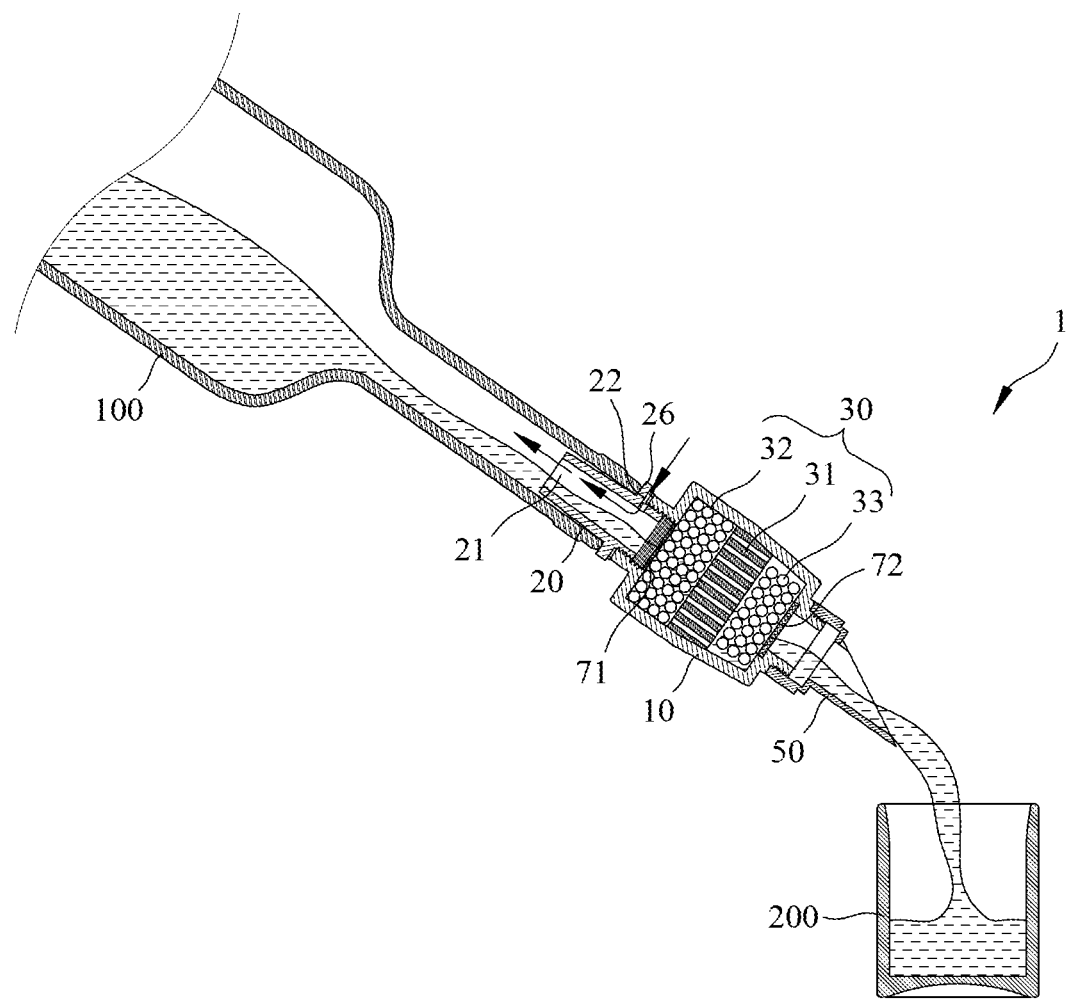
FIG. 7 illustrates the condition when the liquor within the liquor container passes through the liquor quality optimization device of the present invention into a liquor glass.

FIG. 7 illustrates a condition when the liquor within the liquor container 100 passes the liquor quality optimization device 1 of the present invention into a liquor glass 200. First of all, the liquor within the liquor container 100 passes through the fluid passage 21 in the adaptor head 20 and enters into the receiving chamber 11 in the main body 10, where the liquor molecular refinement structure 30 within the receiving chamber 11 in the main body 10 cuts and refines the macromolecules in liquor into small molecules such that the liquor is finally poured out into the liquor glass 200 through the outlet portion 13 of the main body 10. Note that at this time, during pouring of the liquor, the air exterior of the liquor container 100 enters into the liquor container 100 via the air passage 21 and the fluid passage 22 in the adaptor head 20.

One aspect to note that the liquor quality optimization device 1 of the present invention can cut and refine macromolecules in liquor into small molecules and accelerates the ingredients in the liquor which affects the taste (for example, tannin in red wine or acetaldehyde in whiskey and sorghum). The rate of conversion (through oxidation/esterification/condensation in tannin or acetaldehyde) can reduce the content of ingredients in the liquor that affect the taste, enhance the liquor's taste and mouth feel, and the mouth feel of the liquor becomes much softer and smoother and makes the new brewed liquor more drinkable. The mouth feel is as sweet as the aged liquor, reducing the average person's burden of purchasing expensive aged liquor.

Moreover, during the conversion of the macromolecules in liquor into small molecules, the contact area and time of liquor and oxygen increases and oxidation is accelerated, thereby making the taste of liquor softer and smooth and the aromaricher, this is called decanting. Hence, the liquor quality optimization device of the present invention is suitable for decanting red wine having high content of tannin.

In addition, the liquor molecular refinement structure can filter sediments in liquor to enhance the taste of liquor.

It is to note that if the adaptor head 20 is not provided with the air passage 22, the outside air must enter from the outlet portion 13 of the main body 10 and pass through the receiving chamber 11 of the main body 10 and the fluid passage 21 of the adapter head 20 before entering the liquor container 100. Since the liquor molecular refinement structure 30 already occupies a certain space of the receiving chamber 11 of the main body 10, the receiving chamber 11 can provide a limited space for fluids such as liquor and air to flow. Under this condition, the air entering the receiving chamber 11 of the main body 10 from the outlet portion 13 will occupy the flow space of the liquor entering the receiving chamber 11 of the main body 10 from the fluid passage 21 of the adapter head 20, and both the flow directions are opposite relative to each other, so the air will seriously impede the flow of the liquor, resulting in a decrease in the flow of liquor in the liquor quality optimization device 1 within a unit time, which not only severely reduces the conversion rate of the macromolecules in liquor into small molecules. The efficiency of ingredient cutting into small molecules will also reduce the flow rate of the liquor and the time for the liquor to pass the liquor quality optimization device 1 will be prolonged consequently.

In order to solve the above problem, the adapter head 20 is capable of connecting the liquor container 100 and allowing the liquor to pass into the receiving chamber 11, and also allows the space inside the liquor container 100 and the outside through the air passage 22 remains open. Since the position of the air passage 22 is closer to the liquor container 100 than the outlet portion 13 of the main body 10, the external air preferentially enters the fluid passage 21 from the air passage 22 and then enters the liquor container 100 without coming from the outlet portion 13 of the main body 10 so that no air can occupy the flow space of the liquor entering the receiving chamber 11 of the main body 10. Without the obstruction of the air, the flow of the liquor through the liquor quality optimization device of the present invention can be maintained at the maximum in unit time, greatly improves the liquor molecular refinement structure 30 for effectively cutting and refining the macromolecules in the liquor into small molecules. Increase the flow rate of the liquor can effectively shorten the time for the liquor to pass through the liquor quality optimization device 1.

Note that if the side of the air passage 22 of the adaptor head 20 is facing downward, the liquor will overflow through the air passage 22, which is very wasteful. In addition, the air passage 22 is blocked by the liquor and the outside air is prevented from entering the liquor container 100 through the air passage 22 and the fluid passage 21 of the adapter head 20 in sequence, thereby losing the function of the air passage 22. Therefore, during the entire process of pouring the liquor container 100 into the liquor quality optimization device 1, the air passage 22 of the adaptor head 20 is opened upward and is kept upward as best shown in FIG. 7. The outside air enters the liquor container 100 through the air passage 22 and the fluid passage 21 of the adapter head 20 in sequence. The user should note this important fact.

If the diameter of the air passage 22 is too large, the flow rate of the external air passing through the air passage 22 will be too fast, which will allow the liquor to flow through the liquor quality optimization device 1 at an excessively fast flow rate, thereby reducing the effect of cutting and refining macromolecules in liquor into small molecules in the liquor quality optimization device 1 of the present invention.

Similarly, if the diameter of the air passage 22 is too small, the flow rate of the outside air passing through the air passage 22 will be too slow, instead, the flow speed of the liquor will be reduced, and the time for the liquor to pass the liquor quality optimization device 1 will be prolonged consequently.

In order to avoid the occurrence of above-mentioned situation, experiments and tests are carried out to find that when the diameter of the air passage 22 is 2 mm, the outside air passing through the air passage 22 at the most appropriate flow rate can be effectively controlled, and allows the liquor to pass through the liquor quality optimization device 1 of the present invention at an appropriate flow rate, in addition to fully cut and refine macromolecules in liquor into small molecules, which in turn, avoids liquor from passing through the liquor quality optimization device 1 for too long.

Referring again to FIGS. 1 to 6, in the first embodiment of the present invention, the adaptor head 20 has an annular flange 23, an inlet coupler portion 24 disposed on a top side of the annular flange 23 and installed detachably on the inlet portion 12 of the main body 10, and a container coupler portion 25 attached to a bottom side of the annular flange 23 and capable of inserting into the liquor container 100. To be more specific, the inlet coupler portion 24 of the adaptor head 20 has external threads while the inlet portion 12 of the main body 10 has internal threads for threadedly fastening the two together. In other embodiments, the inlet coupler portion 24 of the adaptor head 20 can be connected at the inlet portion 12 of the main body 10 in other manners. Preferably, in this embodiment, the inlet portion 12 extends downwardly and axially from a bottom side of the main body 10 and in other embodiment, the inlet portion 12 may extend upward and axially from the bottom side of the main body 10 into the receiving chamber 11. The annular flange 23 has an outer diameter greater than outer diameters of the inlet coupler portion 24 and the container coupler portion 25 such that upon insertion the container coupler portion 25 into the liquor container 100 results in abutment of the liquor container 100 against the bottom side of the annular flange 23, the fluid passage 21 extends through the inlet coupler portion 24, the annular flange 23 and the container coupler portion 25 and penetrates through an end portion of the inlet coupler portion 24 and an end portion of the container coupler portion 25 while the air passage 22 extends through inner and outer side walls of the inlet coupler portion 24.

Referring again to FIGS. 2 to 6, the liquor molecular refinement structure 30 further includes a block 41 disposed on the top side of the annular flange 23 and abutted to a bottom side of the inlet portion 12 of main body 10 such that the block has a thickness greater than or equal to a distance between a bottom side of an opening of the air passage 22 and the top side of the annular flange 23. In other words, the block 41 is capable of preventing the opening of the air passage 22 into interior of the inlet portion 12 and the inner side surface of the inlet portion 12 of the main body cover the opening of the air passage 22 up, hence permitting communication of the air passage 22 of the adaptor head 20 with the outside air.

In more detail, the liquor quality optimization device 1 of the present invention includes three blocks 42-44. In other words, the liquor quality optimization device 1 of the present invention includes a total of four blocks 41 to 44. Two of the blocks 41 and 42 are respectively located at two sides of the opening of the air passage 22, and the other two blocks 43 and 44 are respectively located at opposite side of the blocks 41, 42 on the top surface of the annular flange or the bottom surface of the inlet portion 12 of the main body 10, and all the blocks has the same the thickness. Therefore, the blocks 41-44 can ensure that the adapter head 20 does not deviate to any side with respect to the main body 10, so that the opening of the air passage 22 enters the inlet portion 12 of the main body 10.

As best shown in FIGS. 2 to 6, in the first embodiment, the blocks 41-44 are disposed on the top side of the annular flange 23 so as to abut against the bottom side of the inlet portion 12 of the main body 10 once the adaptor head 20 is coupled with the main body 10, wherein two of the blocks 41, 42 are located at two sides of the air passage 22 while the other two blocks 43, 44 on the top side of the annular flange 23 are located at position opposite to the former two. All the blocks have the same thickness. To be more specific, when the blocks 41-44 abut against the bottom side of the inlet portion 12 of the main body 10, the thickness of the blocks is equivalent to the distance from the bottom side of the opening of the air passage 22 and the top side of the annular flange 23. Of course, the thickness of the blocks 41-44 of this embodiment can be modified to be larger than the distance between the bottom side of the opening of the air passage 22 and the top side of the annular flange 23.

In other embodiment, the blocks 41-44 are on the bottom side of the inlet portion 12 of the main body 10 to abut against the top side of the annular flange 23; where two of the blocks 41 and 42 are respectively located at two sides of the opening of the air passage 22 while the other two blocks 43, 44 are respectively located at the positions opposite to the former two blocks 41, 42 on the bottom side of the inlet portion 12 of the main body 10. All the blocks 41-44 have the equal thickness. When the blocks 41-44 abut against the top side of the annular flange 23, the thickness of the blocks 41-44 is equal to the distance between the bottom side of the opening of the air passage 22 and the top side of the annular flange 23. Of course, the thickness of the blocks 41 to 44 of this embodiment can be modified to be larger than the distance between the bottom side of the opening of the air passage 22 and the top side of the annular flange 23.

Preferably, the opening of the air passage 22 is adjacent to the top side of the annular flange 23, as shown in FIGS. 2, 3, 5, and 6. Hence, the air passage 22 is located at the position where the inlet coupler portion 24 is closest to the liquor container 100, and the flow path of air entering the liquor container 100 through the air passage 22 and the fluid passage 21 is shortened, shortening the time for the air to be refilled into the liquor container 100.

As a matter of fact, the opening of the air passage 22 is relatively small and is not easily visible, and particularly when it is located very close to the top side of the annular flange 23, it is more difficult to been seen. In this case, the user may misjudge the position of the opening of the air passage 22, resulting in that during the pouring of the liquor from the liquor container 100 into the liquor quality optimization device 1 of the present invention, the side of the air passage 22 can tend downward, so that the liquor overflows through the air passage 22 and thus blocking the air passage 22.

In order to solve the above problem, as shown in FIGS. 1, 2, 3, and 5, the adapter head 20 further includes an air passage position indicator 26 disposed on an outer wall surface of the annular flange 23 corresponding to the opening of the air passage 22. The user can easily know the position of the opening of the air passage 22 through the air passage position indicator 26, and there is absolutely no possibility of misjudgment, ensuring that the liquor container 100 is poured into the liquor quality optimization apparatus 1 of the present invention, during which, the side of the air passage 22 in the adaptor head 20 is kept facing upwards to prevent the overflow of the liquor through the air passage 22 and the blocking of the air passage 22.

Preferably, the air passage position indicator 26 is a block body, as shown in FIGS. 1, 2, 3 and 5. In other embodiments, the air passage position indicator 26 can be a concave hole or a colored pattern.

Preferably, the top side of the annular flange 23 is formed with a channel 231. The channel 231 extends radially and inwardly from the outer wall surface of the annular flange 23 to the opening of the air passage 22 and communicates with the air passage 22, as shown in FIGS. 2, 3, and 5. As a result, the channel 231 can guide the outside air to concentrate into the air passage 22, increase the flow rate of the outside air into the air passage 22, and shortening the time for the air to be replenished into the liquor container 100. Through experimental tests, it is found that when the width of the channel 231 is 2 mm, the external air can be effectively controlled to enter the air passage 22 at the most appropriate flow rate, allowing the liquor to pass through the liquor quality optimization device 1 at an appropriate flow rate, in addition to fully cut and refine macromolecules in liquor into small molecules, which in turn, avoids liquor from passing through the liquor quality optimization device 1 for too long.

As shown in FIGS. 1 and 2, the liquor quality optimization device 1 of the present invention further includes a liquor pouring head 50 coupled to the outlet portion 13 of the main body 10 and having a liquor discharge outlet 51 in communication with the receiving chamber 11 of the main body 10. More specifically, the outlet portion 13 extends upwardly from the top side of the main body 10. The liquor pouring head 50 includes an outlet coupler portion 52 and a liquor guide section 53 extending axially from the outlet coupler portion 52. The outlet coupler portion 52 is detachably provided on the outlet portion 13 of the main body 10 and the liquor guide section 53 has a liquor discharge mouth 531 inclined with respect to an axis of the liquor guide section 53. The liquor discharge outlet 51 extends from the outlet coupler portion 52 toward the liquor guide section 53. As shown in FIG. 7, the liquor, which has been cut and refined into small molecules flows out of the outlet portion 13 of the main body 10, passes through the liquor discharge outlet 51 of the liquor pouring head 50, and enters the liquor glass 200 along the liquor discharge mouth 531. In the first embodiment, the outer side of the outlet portion 13 of the main body 10 has an external thread, and the inner side of the outlet coupler portion 52 of the liquor pouring head 50 has an internal thread, and the outlet coupler portion 52 of the liquor pouring head 50 is threadedly connected at the outlet portion 13 of the main body 10. In other embodiments, the outlet coupler portion 52 of the liquor pouring head 50 can be connected at the outlet portion 13 of the main body 10 in other manners.

As shown in FIGS. 1 and 2, the liquor quality optimization device 1 of the present invention further includes a cover 60, which is detachably assembled to the outlet coupler portion 52 of the liquor pouring head 50 to enclose a storage space (not shown). The liquor guide section 53 of the liquor pouring head 50 is covered by the cover 60, so that the liquor guide section 53 is accommodated in the storage space. In some cases, the liquor quality optimization device 1 is connected to the liquor container 100, but when the liquor in the liquor container 100 is not immediately poured out, the cover 60 can block a large amount of air from passing through the liquor quality optimization device 1 and enters the liquor container 100 to prevent the liquor from being oxidized at this time. In case the liquor container 100 is unfortunately knocked down at this time, the cover 60 also has the effect of preventing the liquor from oozing out.

As shown in FIG. 5, in the first embodiment, the liquor molecular refinement structure 30 includes a filtering block 31, a plurality of first filtering particles 32, and a plurality of second filtering particles 33. The filtering block 31 is disposed in the receiving chamber 11 of the main body 10 to divide the receiving chamber 11 of the main body 10 into a first chamber 111 and a second chamber 112, and has a plurality of parallel gaps 311. The first chamber 111 is adjacent to the inlet portion 12 of the main body 10, and the second chamber 112 is adjacent to the outlet portion 13 of the main body 10. The first filtering particles 32 are disposed in the first chamber 111 while the second filtering particles 33 are disposed in the second chamber 112.

Preferably, the filtering block 31 is a far-infrared ceramic, the first filtering particles 32 and the second filtering particles 33 are far infrared ceramics, maifanite (maifan stone), tourmaline, phyllite, zeolite or a combination thereof. More specifically, because far-infrared ceramics, maifan stone, tourmaline, phyllite, zeolite and other materials, all have the ability to cut and refine the macromolecules in liquor into small molecules, they are very suitable for serving as the filtering block 31, the first filtering particles 32 and the second filtering particles 33. Among them, the far-infrared ceramic is suitable for being processed into a block having a plurality of parallel gaps 311, and therefore is particularly suitable as the filtering block 31. However, the scope thereof should not limited thereto, any material having the ability to cut and refine the macromolecules in the liquor into small molecules can be used as the filtering block 31, the first filtering particles 32, and the second filtering particles 33.

In order to prevent the first filtering particles 32 and the second filtering particles 33 from rolling out off the inlet portion 12 and the outlet portion 13 of the main body 10, the liquor quality optimization device 1 of the present invention further includes two partition nets 71 and 72 respectively provided on the inner side surface of the inlet portion 12 of the main body 10 and the inner side surface of the outlet portion 13 of the main body 10. The partition nets 71 and 72 have a plurality of net openings with diameter smaller than the diameter of the first filtering particles 32 and the diameter of the second filtering particles 33 such that the two partition nets 71, 72 can successfully block the first filtering particles 32 and the second filtering particles 33 so as to be maintained in the first chamber 111 and the second chamber 112, respectively, thereby preventing from rolling out off the inlet portion 12 and the outlet portion 13 of the main body 10.

As shown in FIG. 7, in the first embodiment, after the liquor containing in the liquor container 100 passes through the fluid passage 21 of the adaptor head 20 and the net openings of the partition net 71, the liquor first of all contacts with the first filtering particles 32 in the first chamber 111, and flows along the gaps among the first filtering particles 32, where the first filtering particles 32 cut and refine the macromolecules in the liquor by means of its ability to refine the small molecules to complete the first cutting and refining process. Then, the small molecules in refined liquor after the first cutting and refining process contact the filtering block 31 and flow along the parallel gaps 311 of the filtering block 31, where, the filtering block 31 cuts and refines the small molecules in the refined liquor by the ability to form a smaller molecular components and completes the second cutting and refining process. Finally, the smaller molecular components in the second refined liquor contact the second filtering particles 33, and the liquor flows along the gaps among the second filtering particles 33. The second filtering particles 33 cut and refine the smaller molecular components by means of its ability to form the smallest molecular components, and completes the third cutting and refining process. After the macromolecules in the liquor are subjected to three-time cutting and refining treatment, the liquor is composed of the smallest molecular components and then passes the net openings of the partition net 72, the outlet portion 13 of the main body 10, and the liquor discharge outlet 51 of the liquor pouring head 50 and flows into the liquor glass 200.

The liquor containers 100 are usually bottles. In order to facilitate the connection of a bottle with the liquor quality optimization device 1 of the present invention and later pour the liquor into the liquor glass 200 at an inclined angle, the main body 10 is preferably fabricated in cylindrical shape, as shown in FIGS. 1 to 7.

Figure 8:
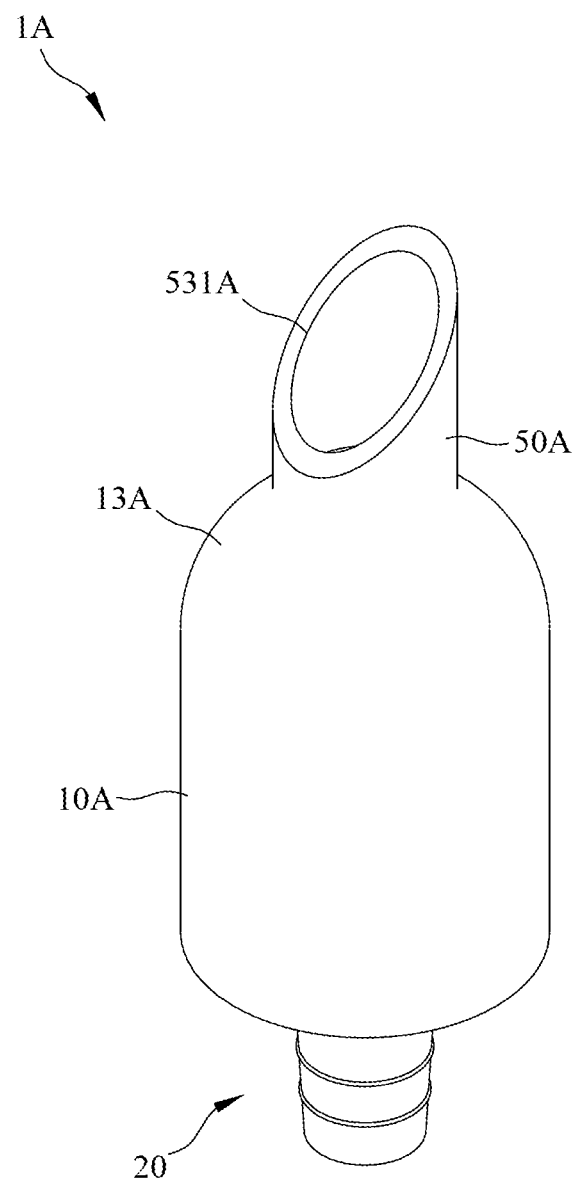
FIG. 8 is a perspective view of a liquor quality optimization device according to a second embodiment of the present invention.
Figure 9:
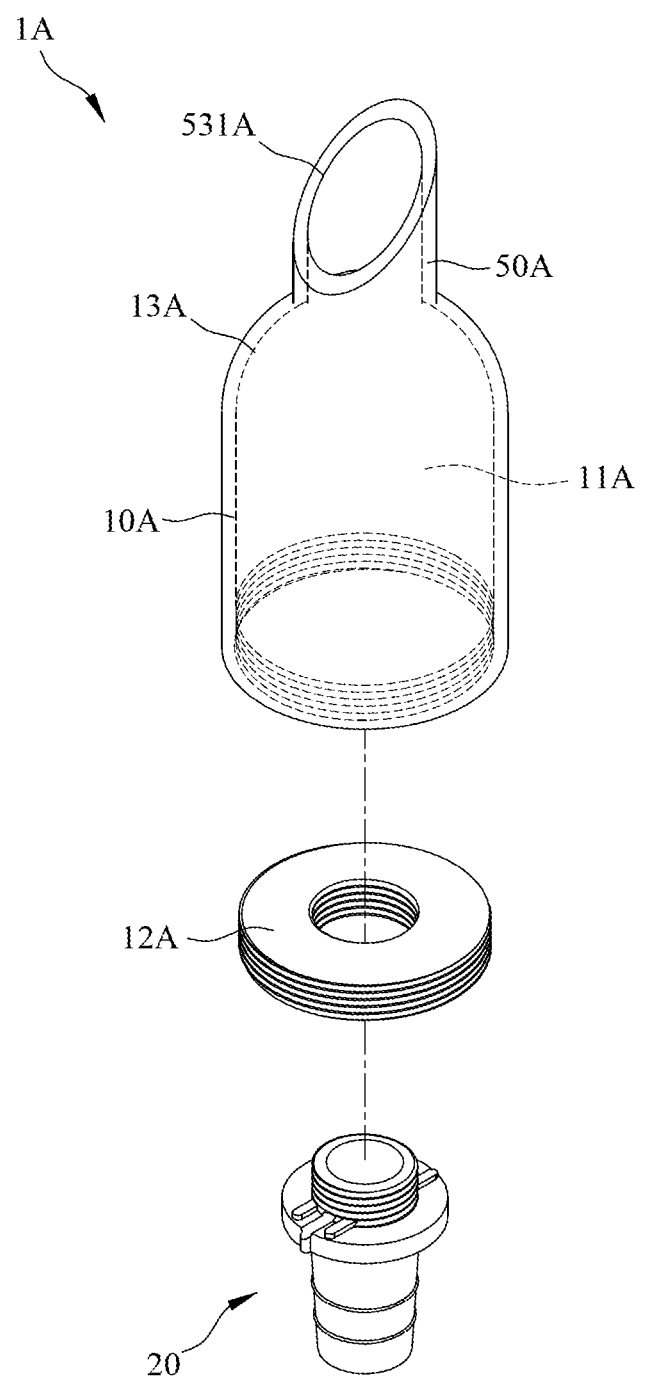
FIG. 9 is a perspective and exploded view of the liquor quality optimization device according to the second embodiment of the present invention.

Referring to FIGS. 8 and 9, wherein, FIG. 8 is a perspective view of a liquor quality optimization device according to a second embodiment of the present invention; and FIG. 9 is a perspective and exploded view of the liquor quality optimization device according to the second embodiment of the present invention. The structure of the main body 10A of the liquor quality optimization device 1A of the second embodiment is slightly different from that of the main body 10 of the liquor quality optimization device 1 of the first embodiment, and the rest of the configuration is the same. To be more specific, the internal surface of the receiving chamber 11A of the main body 10A has an internal thread near the bottom thereof, the external surface of the inlet portion 12A of the main body 10A has an external thread, and the inlet portion 12A is screwed onto the main body 10A in the receiving chamber 11A near its bottom. In other words, the inlet portion 12A and the main body 10A of the liquor quality optimization device 1A of the second embodiment are a detachable combination, and the inlet portion 12 and the main body 10 of the liquor quality optimization device 1 of the first embodiment. 10 is a one-piece structure. In addition, the liquor pouring head 50A of the liquor quality optimization device 1A of the second embodiment is integrally formed on the outlet portion 13A of the main body 10A, and the liquor discharge mouth 531A is formed on one side thereof In the first embodiment, the outlet coupler portion 52 of the liquor pouring head 50 of the liquor quality optimization device 1 is detachably provided at the outlet portion 13 of the main body 10.

Figure 10:
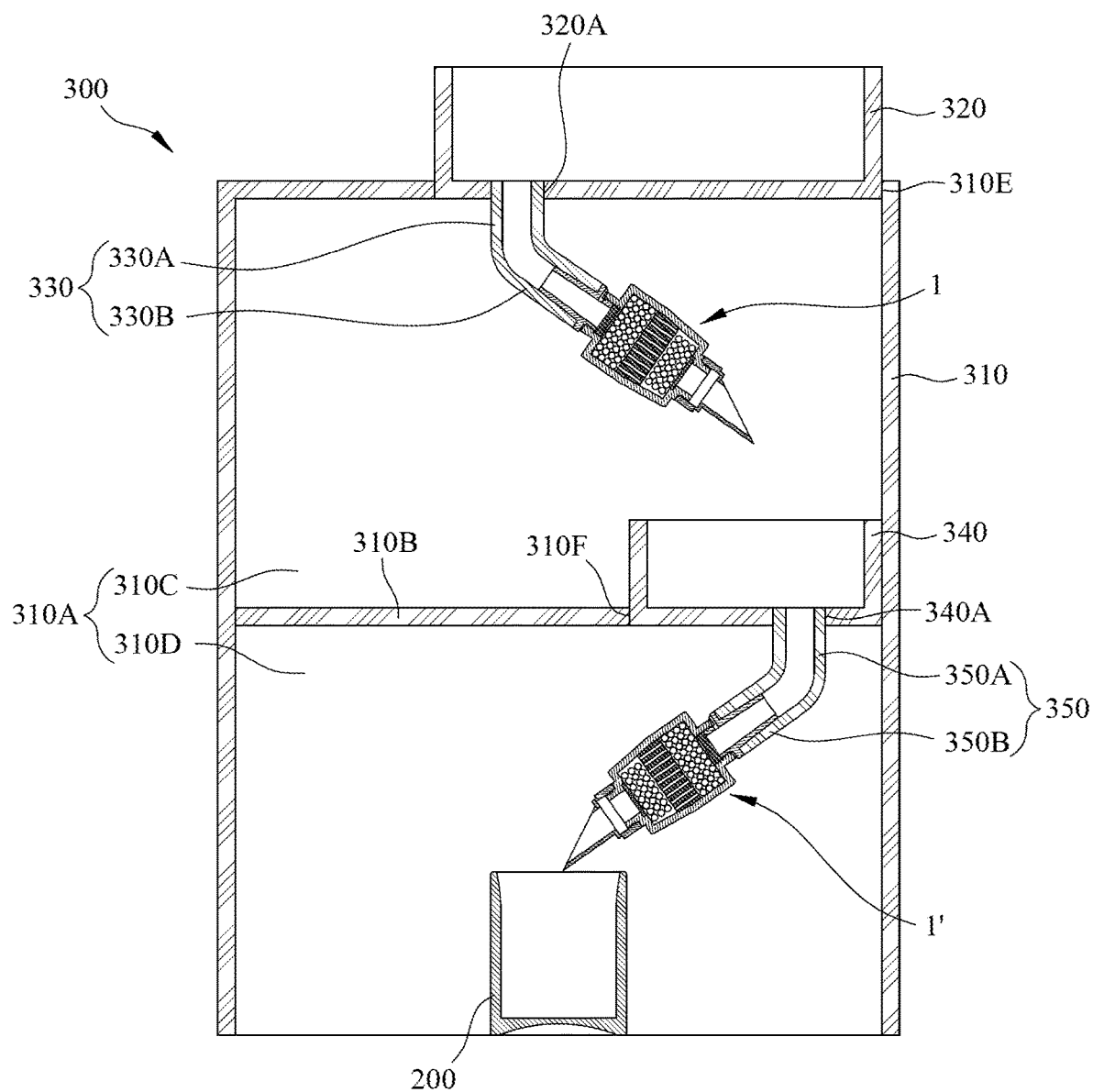
FIG. 10 illustrates a cross-sectional view of a liquor quality optimization device according to a third embodiment of the present invention.

FIG. 10 illustrates a cross-sectional view of a liquor quality optimization device according to a third embodiment of the present invention, wherein, the third embodiment is an application example, in which a plurality of liquor quality optimization devices 1, 1' are combined with a special liquor container 300 as a systemized device. Further, the liquor container 300 includes a chest 310 defining a receiving chamber 310A, a liquor trough 320, an upper guide tube 330, a liquor receiving trough 340, and a lower guide tube 350. The liquor trough 320 is provided on the top side of the chest 310. The upper guide tube 330 is connected to the liquor trough 320 and extends into the receiving chamber 310A in the chest 310. The liquor receiving trough 340 is disposed in the receiving chamber 310A of the chest 310. The lower guide tube 350 is connected to the liquor receiving trough 340. Two adapter heads 20 of the liquor quality optimization devices 1, 1' are respectively connected to the upper guide tube 330 and the lower guide tube 350, and the outlet portion 13 of the main body 10 of the liquor quality optimization device 1 connected with the upper guide tube 330 is located above the liquor receiving trough 340.

Figure 11:
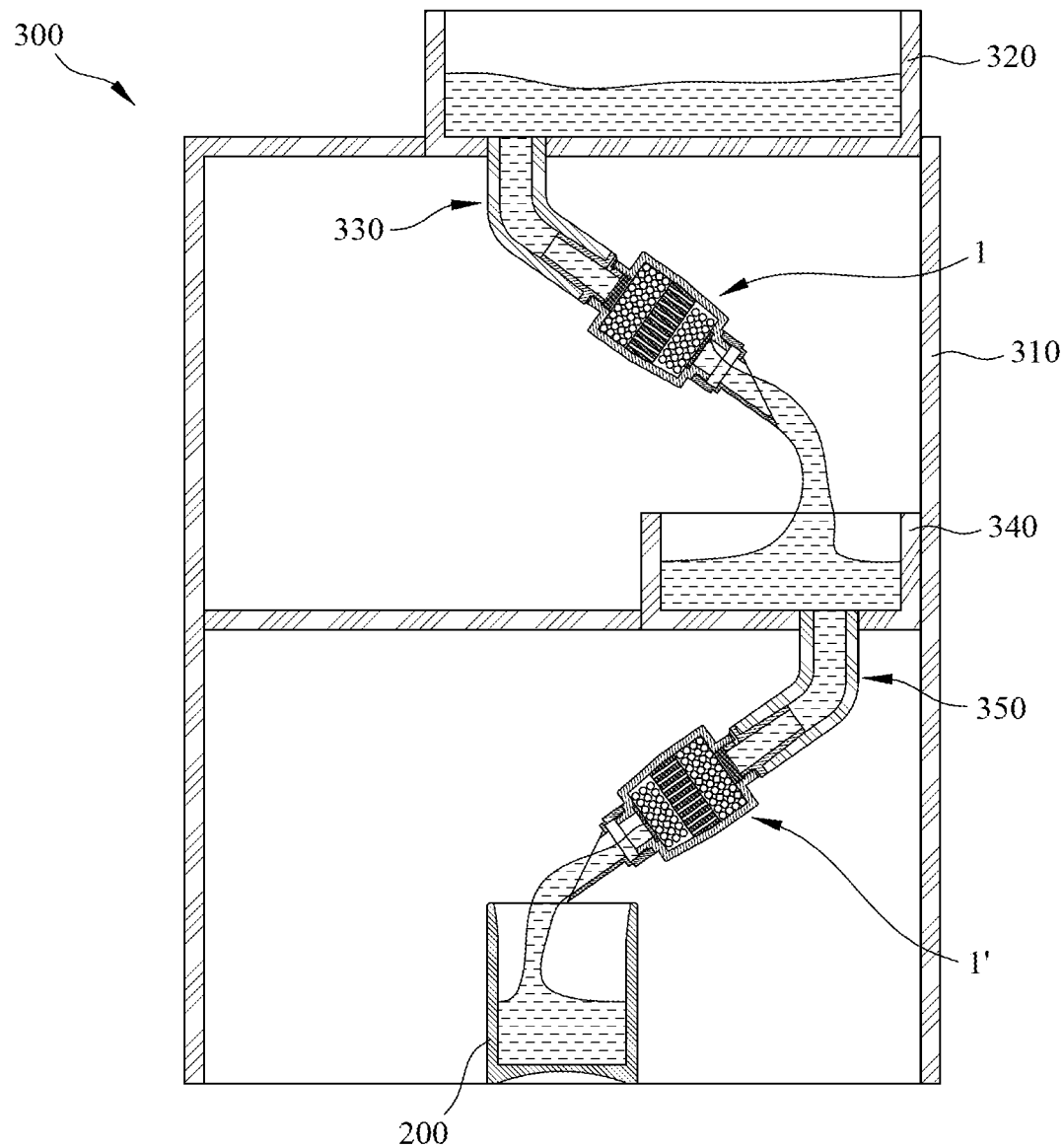
FIG. 11 illustrates a cross-sectional view of the liquor quality optimization device according to the third embodiment of the present invention in application.

FIG. 11 illustrates a cross-sectional view of the liquor quality optimization device according to the third embodiment of the present invention. As shown, the chest 310 further includes a partition 310B dividing the receiving chamber 310A into an upper chamber 310C and a lower chamber 310D, the upper guide tube 330 extends into the upper chamber 310C, in which the liquor receiving trough 340 is provided while the lower guide tube 350A extends into the lower chamber 310D.

Preferably, the liquor trough 320 is disposed on a top side of the chest 310 by inserting into a mounting hole 310E formed at the top side thereof, and has a bottom formed with a through hole 320A. The upper guide tube 330 has a vertical section 330A inserted into the through hole 320A of the liquor trough 320, and a slanted section 330B extending inclinedly with respect to an axis of the vertical section 330A into the upper chamber 310C so as to define an obtuse angle therebetween. One adapter head 20 of one liquor quality optimization device 1 is inserted into the slanted section 330B of the upper guide tube 330.

Preferably, the partition 310B defines a coupling hole 310F. The liquor receiving trough 340 is disposed within the receiving chamber 310A by inserting into the coupling hole 310F in the partition 310B, and has a bottom formed with a mounting hole 340A, into which a vertical section 350A of the lower guide tube 350 is inserted such that the lower guide tube 350 is connected with the liquor receiving trough 340. The lower guide tube 350 further has a slanted section 350B extending inclinedly with respect to an axis of the vertical section 350A into the lower chamber 310D so as to define an obtuse angle therebetween. One adapter head 20 of the other liquor quality optimization device 1' is inserted into the slanted section 350B of the lower guide tube 350.

FIG. 11 illustrates a cross-sectional view of the liquor quality optimization device according to the third embodiment of the present invention in application. First, the liquor is poured into the liquor trough 320, and the liquor in the liquor trough 320 enters the liquor optimization devices 1 through the upper guide tube 330. Through the liquor quality optimization devices 1, the macromolecules in the liquor have been cut and refined into small molecules, and then the liquor flows into the liquor receiving trough 340. Then, the liquor in the liquor receiving trough 340 enters another liquor quality optimization device 1' via the lower guide tube 350, where the small molecules have been cut and refined by another liquor quality optimization device 1' to form a very tiny small molecules, and then flows into the liquor glass 200.

From the foregoing, it can be seen that the systemized third embodiment has multiple liquor quality optimization devices 1, 1' so that the liquor can continuously pass through multiple liquor quality optimization devices 1, 1' so that the liquor finally flows into the liquor glass 200. The molecular composition of the small molecules in the liquor glass 200 liquors is smaller than the molecular composition of the molecular components in the liquor that is cut and refined by the single liquor quality optimization device 1.

Although the effect of cutting and refining the macromolecules in liquor is more evident in the third embodiment than in the first embodiment and the second embodiment, the overall structure is complicated and bulky, the construction cost is high, and it is not easy to carry along with the user.

In contrast, the overall structure of the first embodiment and the second embodiment is relatively simple, small in size, low in cost, and is easy to carry along with the user, but the effect of cutting and refining the macromolecules in liquor is not as good as in the third embodiment.

Figure 12:
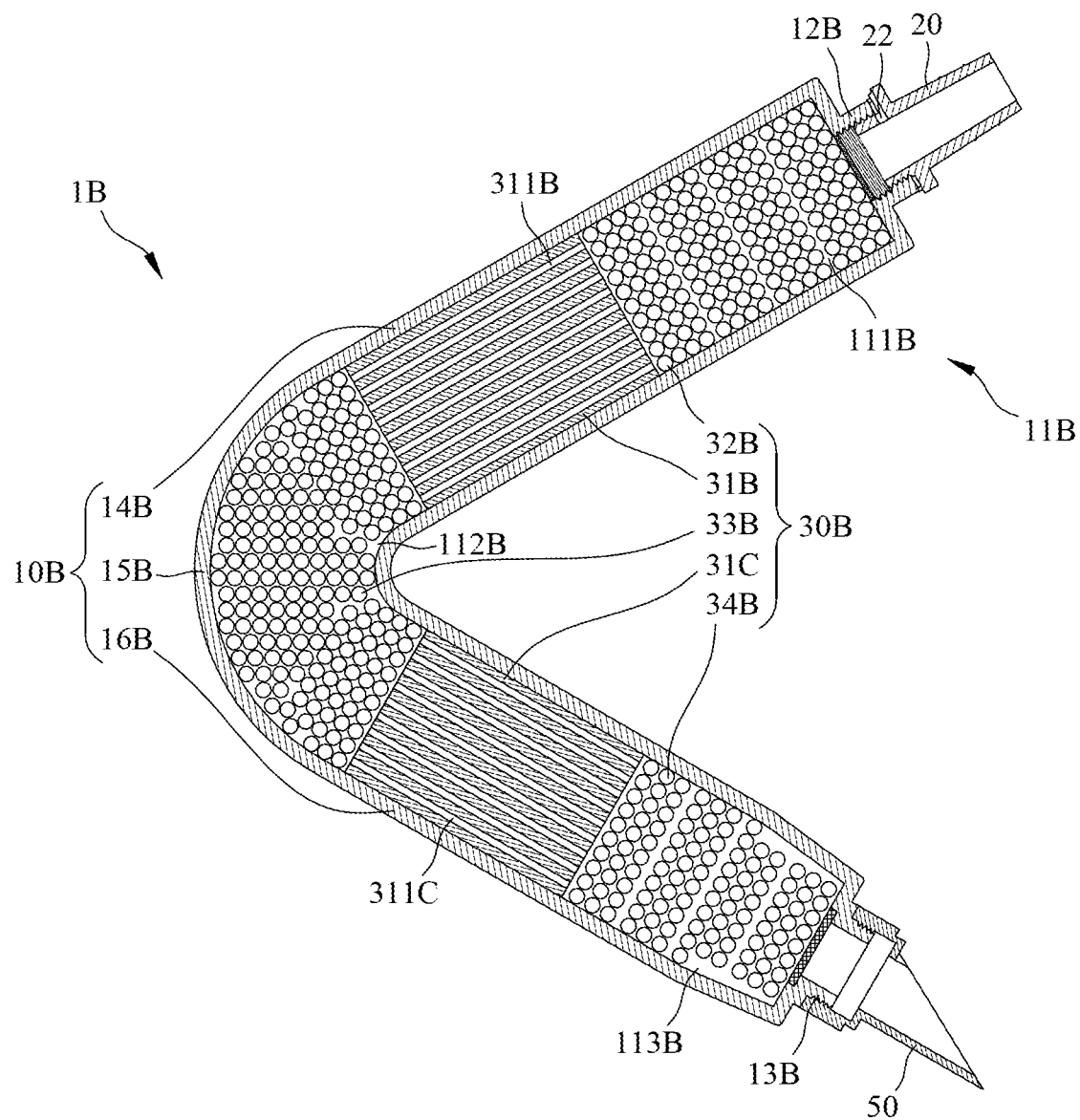
FIG. 12 illustrates a cross-sectional view of a liquor quality optimization device according to a fourth embodiment of the present invention.

FIG. 12 illustrates a cross-sectional view of a liquor quality optimization device according to a fourth embodiment of the present invention. The structures of the main body 10B and the liquor molecular refinement structure 30B of the liquor quality optimization device 1B of the fourth embodiment are slightly different from the structures of the main body 10 and the liquor molecular refinement structure 30 of the liquor quality optimization device 1 of the first embodiment, the rest of the structure is exactly the same as the first embodiment. To be more specific, the main body 10B has a head body portion 14B, a tail body portion 16B and .a bent body portion 15B. The bent body portion 15B is disposed between the head body portion 14B and the tail body portion 16B so that the main body 10B has a bent configuration, wherein, the inlet portion 12B is formed at the head body portion 14B; the outlet portion 13B is formed provided at the tail body portion 16B. The liquor molecular refinement structure 30B includes a first filtering block 31B, a second filtering block 31C, a plurality of first filtering particles 32B, a plurality of second filtering particles 33B, and a plurality of third filtering particles 34B. The first filtering block 31B is provided in the head body portion 14B, and has a plurality of parallel gaps 311B. The second filtering block 31C is provided in the tail body portion 16B, and has a plurality of parallel gaps 311C. The first and second filtering blocks 31B, 31C respectively divide the receiving chamber 11B of the main body 10B into a first chamber 111B, a second chamber 112B, and a third chamber 113B such that the first chamber 111B is located in the head body portion 14B adjacent to the inlet portion 12B, the second chamber 112B is located in the bent body portion 15B while the third chamber 113B is located in the tail body portion 16B adjacent to the outlet portion 13B.

Preferably, the first filtering block 31B and the second filtering block 31C are far-infrared ceramics, and the first filtering particles 32B, the second filtering particles 33B and the third filtering particles 34B, each of which is selected from a group consisting of a far infrared ceramic, a maifan stone, a tourmaline, a phyllite, a zeolite or a combination thereof. To be more specific, because far-infrared ceramics, maifan stone , tourmaline, phyllite, zeolite and other materials all have the ability to cut and refine the macromolecules in liquor into small molecules, they are very suitable for serving as the first filter filtering block 31B, the second filtering block 31C, the first filtering particles 32B, the second filtering particles 33B, and the third filtering particles 34B. Among them, far-infrared ceramics are suitable for being processed into a block-like structure having the parallel gaps, and therefore are particularly suitable as the first filtering block 31B and the second filtering block 31C. However, without being limited thereto, any material having the ability to cut and refine the macromolecules in the liquor into small molecules can be used as the first filtering block 31B, the second filtering block 31C, and the first filtering particles 32B, the second filtering particles 33B, and the third filtering particles 34B.

Figure 13:
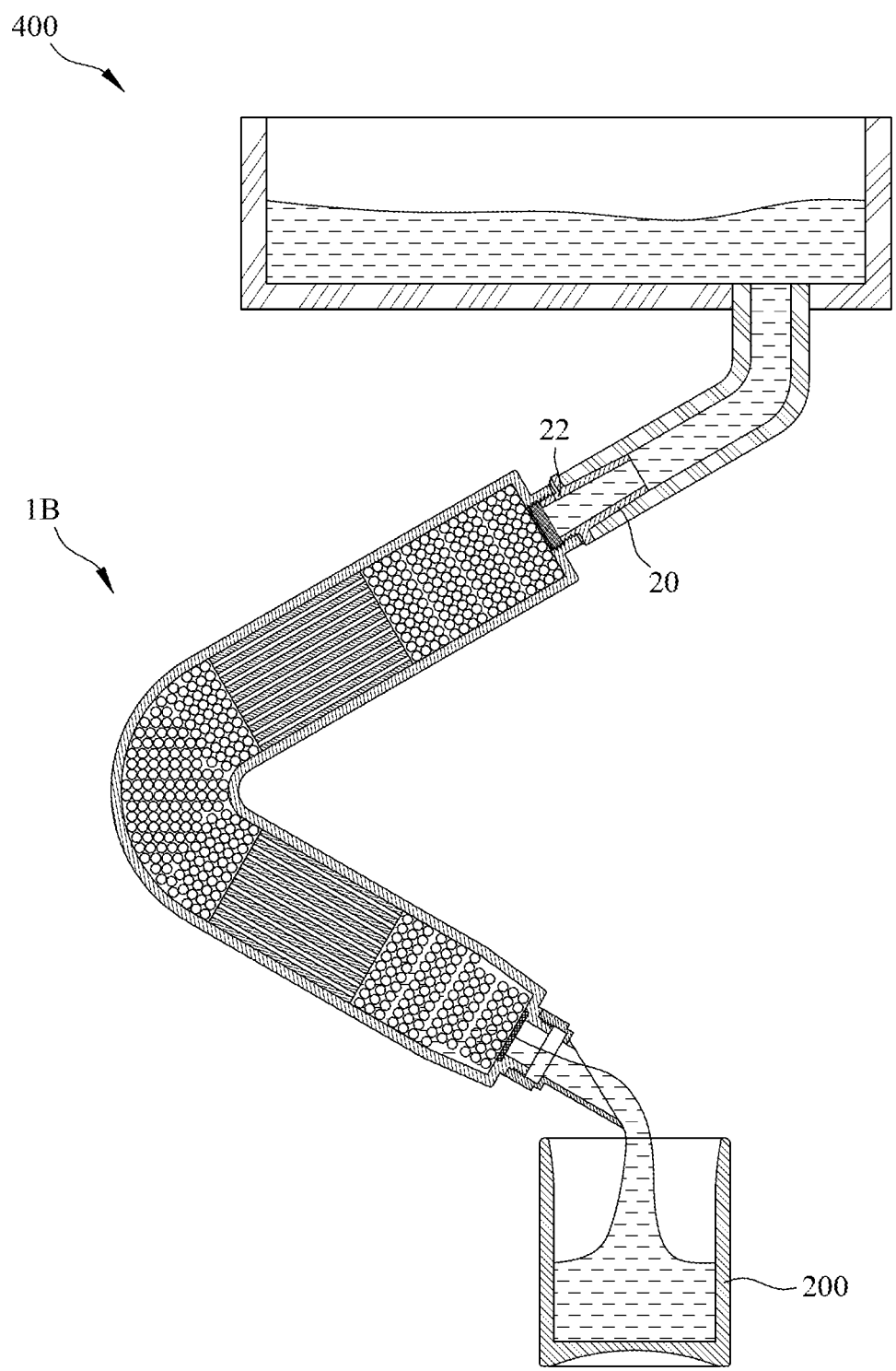
FIG. 13 illustrates a cross-sectional view of the liquor quality optimization device according to the fourth embodiment of the present invention in application.

FIG. 13 illustrates a cross-sectional view of the liquor quality optimization device according to the fourth embodiment of the present invention in application, wherein a liquor container 400 is a combination of the liquor trough and the upper guide tube similar to the third embodiment. The liquor quality optimization device 1B according to the fourth embodiment of the present invention is connected with the upper guide tube of the liquor container 400. First, the liquor is poured into the liquor trough, and after the liquor in the liquor trough passes through the fluid passage of the adapter head 20 and the net openings of the partition net via the upper guide tube, the liquor contacts with the first filtering particles 32B in the first chamber 111B, and flows along the gaps between the first filtering particles 32B. The first filtering particles 32B cut and refine the macromolecules in the liquor by its ability to refine the small molecules to complete the first cutting and refining treatment. Then, the small molecules in the liquor are subjected to contact with the first filtering block 31B, and flows along the parallel gaps 311B of the first filtering block 31B, where, the first filtering block 31B cuts and refines the small molecules in the first refined liquor to a smaller molecular components by its ability to complete the second cutting refinement process. Then, the small molecules in the liquor are subjected to contact with the second filtering particles 33B, and the liquor flows along the gaps between the second filtering particles 33B. The second filtering particles 33B cut and refine the small molecules in the second refined liquor by the ability to refine the small molecules to complete the third cutting and refining process. Next, the small molecules in the liquor that has been subjected to contact with the second block filter 31C and the liquor flows along the parallel gaps 311C of the second filtering block 31C. The second filtering block 31C cuts and refines small molecules in the third refined liquor to form smaller molecular components by its ability to complete the fourth cutting and refining process. Finally, the small molecules in the fourth refined liquor contact the third filtering particles 34B, and the liquor flows along the gaps between the third filtering particles 34B. The third filtering particles 34B cut and refine small molecule components in the fourth refined liquor to form extremely smaller molecular components by its ability to complete the fifth cutting and refining process. After the macromolecules in the liquor are subjected to a five-cutting and refining treatment, the transforming components constitute relatively small molecules, and then flow into the liquor glass 200 after passing through the net openings of the partition net and the outlet portion 13B of the main body 1B.

From the foregoing, it can be seen that the overall structure of the fourth embodiment is more complicated than the first embodiment, but is much simpler than the third embodiment, so that the volume is slightly larger than the first embodiment, but is much smaller than the third embodiment. An important aspect is that the fourth embodiment, which is simple in structure compared to the third embodiment, can be configured with more pieces of filtering blocks and filtering particles in the receiving chamber 11B of the main body 10B due to the design of the bent body portion. The effect of cutting and refining the molecular components is not smaller when compared with the third embodiment. In other words, the fourth embodiment has the advantages of the prior three embodiments and eliminates the shortcomings of the prior three embodiments.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A liquor quality optimization device, comprising:
a main body defining a receiving chamber, having an inlet portion and an outlet portion;
an adaptor head coupled to said inlet portion of said main body for attachment to a liquor container, having a fluid passage in communication with said receiving chamber of said main body and an air passage in communication between said fluid passage and an exterior of said adaptor head; and
a liquor molecular refinement structure disposed within said receiving chamber in said main body, having properties to cut and refine macromolecules in liquor into small molecules;
wherein said adaptor head has an annular flange, an inlet coupler portion disposed on a top side of said annular flange and installed detachably on said inlet portion of said main body and a container coupler portion disposed on a bottom side of said annular flange and capable of inserting into said liquor container;
wherein said annular flange has an outer diameter greater than outer diameters of said inlet coupler portion and said container coupler portion such that upon insertion said container coupler portion into the liquor container results in abutment of the liquor container against said bottom side of said annular flange , said fluid passage extends through said inlet coupler portion, said annular flange and said container coupler portion and penetrates through an end portion of said inlet coupler portion and an end portion of said container coupler portion while said air passage extends through inner and outer side walls of said inlet coupler portion; and
wherein the liquor quality optimization device further comprises a block disposed on said top side of said annular flange and abutted to a bottom side of said inlet portion of said main body such that said block has a thickness greater than or equal to a distance between a bottom side of an opening of said air passage and said top side of said annular flange.

2. The liquor quality optimization device according to claim 1, wherein said opening of said air passage is located adjacent to said top side of said annular flange, said adaptor head further includes an air passage position indicator formed on an outer wall surface of said annular flange corresponding with said opening of said air passage.

3. The liquor quality optimization device according to claim 2, wherein said top side of said annular flange is formed with a channel extending radially and inwardly from said outer wall surface thereof toward and communicated with said opening of said air passage.

4. The liquor quality optimization device according to claim 1, further comprising a liquor pouring head coupled to said outlet portion of said main body and having a liquor discharge outlet in communication with said receiving chamber of said main body.

5. The liquor quality optimization device according to claim 4, wherein said outlet portion extends upwardly from a top end of said main body , said liquor pouring head further includes an outlet coupler portion for detachably coupling said outlet portion of said main body and a liquor guide section extending axially from said outlet coupler portion and formed with a liquor discharge mouth inclined with respect to an axis of said liquor guide section , said liquor discharge outlet extending and being in communication with said liquor guide section and said outlet coupler portion.

6. The liquor quality optimization device according to claim 4, wherein said liquor pouring head is integrally formed with said outlet portion of said main body and is formed with a liquor discharge mouth inclined with respect to an axis of said liquor pouring head.

7. The liquor quality optimization device according to claim 1, wherein said liquor molecular refinement structure further includes a filtering block, which is disposed within said receiving chamber of said main body to divide said receiving chamber of said main body into a first chamber adjacent to said inlet portion of said main body and a second chamber adjacent to said outlet portion of said main body and which defines a plurality of parallel gaps, a plurality of first filtering particles disposed in said first chamber and a plurality of second filtering particles disposed in said second chamber, wherein, the liquor quality optimization device further includes two partition nets disposed within said main body in such a manner to respectively cover said inlet and outlet portions of said main body, said partition nets having a plurality of net openings with diameters smaller than diameters of said first and second filtering particles.

8. A liquor quality optimization device, comprising:
a main body defining a receiving chamber, having an inlet portion and an outlet portion;
an adaptor head coupled to said inlet portion of said main body for attachment to a liquor container, having a fluid passage in communication with said receiving chamber of said main body and an air passage in communication between said fluid passage and an exterior of said adaptor head; and
a liquor molecular refinement structure disposed within said receiving chamber in said main body, having properties to cut and refine macromolecules in liquor into small molecules,
wherein said adaptor head has an annular flange, an inlet coupler portion disposed on a top side of said annular flange and detachably installed in said inlet portion of said main body and a container coupler portion disposed on a bottom side of said annular flange and capable of inserting into said liquor container;
wherein said annular flange has an outer diameter greater than outer diameters of said inlet coupler portion and said container coupler portion such that upon insertion said container coupler portion into the liquor container results in abutment of the liquor container against said bottom side of said annular flange, said fluid passage extends through said inlet coupler portion, said annular flange and said container coupler portion and penetrates through an end portion of said inlet coupler portion and an end portion of said container coupler portion while said air passage extends through inner and outer side walls of said inlet coupler portion; and
wherein the liquor quality optimization device further comprises a block disposed on a bottom side of said inlet portion of said main body and abutted to said top side of said annular flange such that said block has a thickness greater than or equal to a distance between a bottom side of an opening of said air passage and said top side of said annular flange.

9. The liquor quality optimization device according to claim 8, wherein said opening of said air passage is located adjacent to said top side of said annular flange, said adaptor head further includes an air passage position indicator formed on an outer wall surface of said annular flange corresponding with said opening of said air passage.

10. The liquor quality optimization device according to claim 9, wherein said top side of said annular flange is formed with a channel extending radially and inwardly from said outer wall surface thereof toward and communicated with said opening of said air passage.

11. A liquor quality optimization device, comprising:
a main body defining a receiving chamber, having an inlet portion and an outlet portion;
an adaptor head coupled to said inlet portion of said main body for attachment to a liquor container, having a fluid passage in communication with said receiving chamber of said main body and an air passage in communication between said fluid passage and an exterior of said adaptor head; and
a liquor molecular refinement structure disposed within said receiving chamber in said main body, having properties to cut and refine macromolecules in liquor into small molecules,
wherein the liquor container includes a chest defining a receiving chamber, a liquor trough disposed on a top side of said chest, an upper guide tube connected with said liquor trough and extending interior of said receiving chamber in said chest, a liquor receiving trough disposed within said receiving chamber in said chest, a lower guide tube connected with said liquor receiving trough and said adaptor heads of two of liquor quality optimization devices connected respectively to said upper and lower guide tubes such that said outlet portion of said main body of one of liquor quality optimization devices connected to said upper guide tube is spaced apart and located above said liquor receiving trough.

12. A liquor quality optimization device, comprising:
a main body defining a receiving chamber, having an inlet portion and an outlet portion;
an adaptor head coupled to said inlet portion of said main body for attachment to a liquor container, having a fluid passage in communication with said receiving chamber of said main body and an air passage in communication between said fluid passage and an exterior of said adaptor head; and
a liquor molecular refinement structure disposed within said receiving chamber in said main body, having properties to cut and refine macromolecules in liquor into small molecules,
wherein said main body has a head body portion, a tail body portion and a bent body portion between said head body portion and said tail body portion such that the main body has a bent configuration;
wherein said inlet portion of said main body is formed at said head body portion while said outlet portion of said main body is formed at said tail body portion;
wherein said liquor molecular refinement structure further includes a first filtering block, which is disposed within said head body portion and which defines a plurality of parallel gaps, a second filtering block, which is disposed within said tail body portion and which defines a plurality of parallel gaps, said first and second filtering blocks dividing said main body into a first chamber in said head body portion adjacent to said inlet portion of said main body, a second chamber in said bent body portion and a third chamber in said tail body portion adjacent to said outlet portion f said main body;
wherein a plurality of first filtering particles disposed in said first chamber and a plurality of second filtering particles disposed in said second chamber and a plurality of third filtering particles disposed in said third chamber; and wherein the liquor quality optimization device further comprising two partition nets disposed within said main body in such a manner to respectively cover said inlet and outlet portions of said main body, said partition nets having a plurality of net openings with diameters smaller than diameters of said first and third filtering particles.

\* \* \* \* \*